Dec. 2, 1958  LA V. H. BECKBERGER  2,862,872
REFORMING AND ISOMERIZATION PROCESS, WITH DEHYDROGENATION
OF UNCONVERTED LIGHT PARAFFINS
Filed Feb. 17, 1953
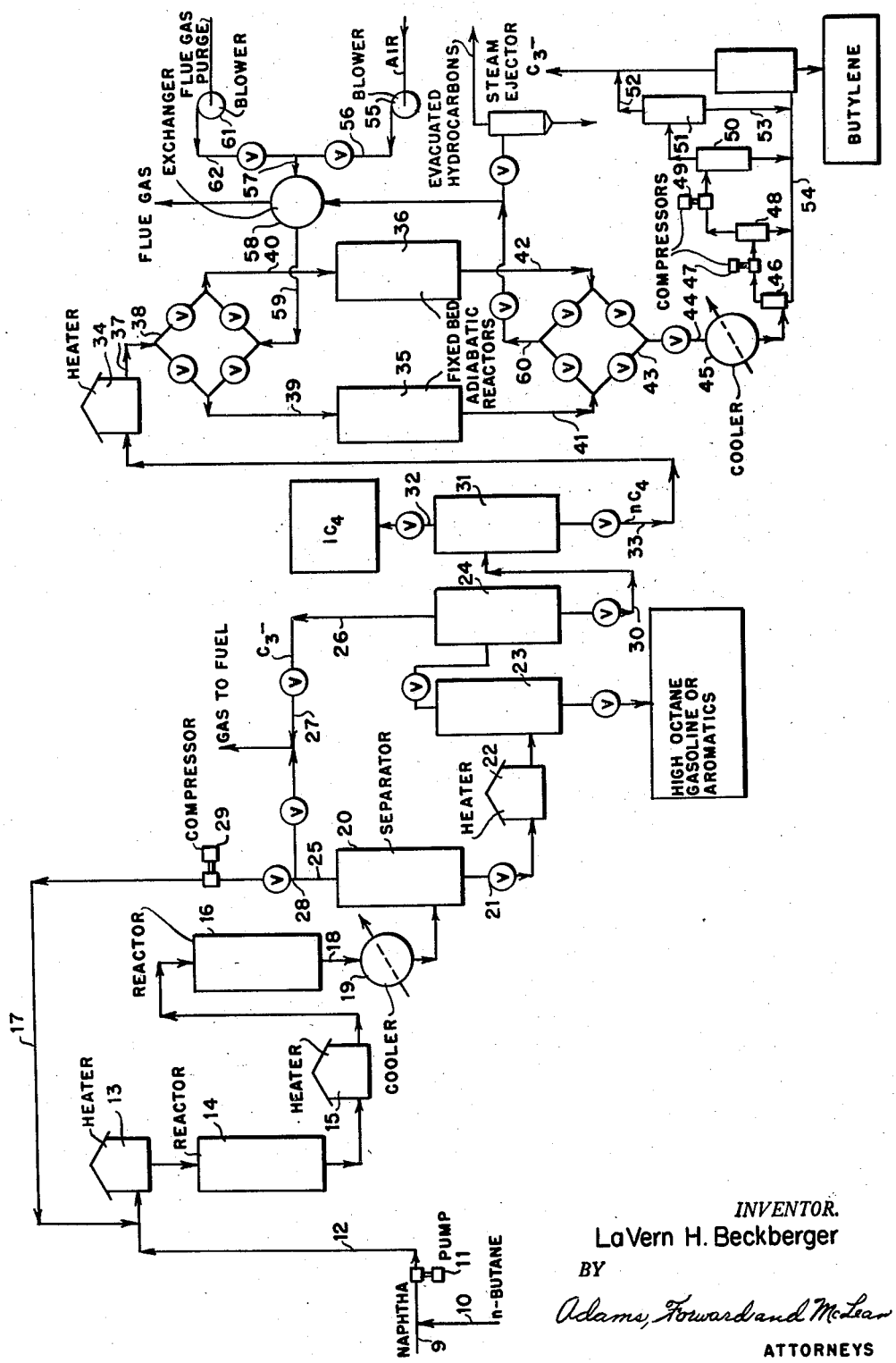
INVENTOR.
LaVern H. Beckberger
BY
Adams, Forward and McLean
ATTORNEYS

2,862,872

REFORMING AND ISOMERIZATION PROCESS, WITH DEHYDROGENATION OF UNCONVERTED LIGHT PARAFFINS

La Vern H. Beckberger, Harvey, Ill., assignor to Sinclair Refining Company, New York, N. Y., a corporation of Maine Application February 17, 1953, Serial No. 337,356

5 Claims. (Cl. 208—65)

This application relates to a two-stage process for catalytic conversion of petroleum hydrocarbon fractions boiling within the gasoline range. More particularly it relates to a process in which a mixture of naphtha and a normal paraffin are charged to the first stage to produce a typical reformate and to obtain partial conversion of the normal paraffin to an isoparaffin and in which the unconverted normal paraffin is charged to a second stage to produce the corresponding normal olefin.

This application is a continuation-in-part of my copending application Serial No. 245,750, filed September 8, 1951, and is directed to a method of operation in which a mixture of 300° to 375° F. boiling range naphtha and a light normally gaseous normal paraffin fraction, such as n-butane and n-pentane or mixtures thereof, are contacted in a first reaction stage with a reforming catalyst in the presence of hydrogen under reforming conditions of temperature, pressure and space velocity to produce a typical reformate while effecting partial conversion of the normal paraffin fraction, e. g. about 25 percent conversion, to an isoparaffin fraction. In the second stage the unconverted portion of the normal paraffin fraction is contacted with a chromium oxide-alumina catalyst under dehydrogenation conditions of space velocity and elevated temperature including subatmospheric pressure to approximately atmospheric pressure to produce a normal olefin fraction. The isoparaffin fraction and the normal olefin fraction may then be charged to an alkylation unit.

The first stage conditions advantageously approximate 500 p. s. i. g. total pressure, 10–1 gas recycle mole ratio, 900° F., 4 LHSV naphtha, 2 LHSV normal paraffin. In the second stage the conditions may be as high as one atmosphere total pressure, 1000 gas hourly space velocity for the normal paraffin feed and 1050° F. for a 10 minute hydrocarbon recycle operation. The hydrogen partial pressure for the first reaction stage is advantageously provided by recycle of hydrogen rich tail gases from the process.

Flexibility and selectivity are provided to a high degree by division of the catalytic conversion reactions into step-wise and selectively conducted isomerization-dehydrogenation reactions in the first stage and dehydrogenation reactions primarily in the second stage. In this respect, chromium oxide-alumina reforming catalysts of the type known to the art, which contain about 10 to 12 percent chromium oxide, have special advantage in a low pressure high temperature reaction combined with a preceding reforming operation. The reforming operation lends itself to the use of a number of catalysts, but with advantage is conducted with a platinum type reforming catalyst such as the platinum-alumina-halide catalyst described in Haensel Patent 2,479,110 or the platinum-alumina-silica catalyst of Ciapetta Patent 2,550,531. Also molybdenum oxide-alumina reforming catalysts are useful and particularly the molybdenum oxide-alumina-silica type catalysts when promoted by addition of a small amount of oxygen or air to the hydrogen gas stream as described in application Serial No. 236,792, filed July 14, 1951, now U. S. Patent No. 2,661,320, of LaVern H. Beckberger and Rudolph E. Woerner. Other reforming catalysts of value are tungsten-nickel sulfide, zinc-magnesia molyblenum oxide, vanadia-chromia on alumina.

According to the particular aspects of my invention represented by the figure, a naphtha feed stock is charged by means of line 9 and n-butane for example, is charged by means of line 10 through pump 11 and line 12 to heater 13. From the heater the vaporized feed is passed through reactor 14, reheater 15 and reactor 16. Because of the endothermic reaction it is advantageous to provide for multi-stage reaction by intermediate reheating of the reaction mixture. At the inlet to heater 13, the naphtha feed and n-butane in line 12 is admixed with hydrogen rich tail gas recycled from the reaction through line 17. Reactors 14 and 16 are charged with a reforming catalyst, advantageously in pelleted or tableted form, disposed as a fixed bed. The effluent from reactor 16 is withdrawn through line 18 and is passed through cooler 19 to separator 20. A liquid fraction is withdrawn through valved connection 21 and passed through heater 22 to stabilizer 23. A liquid fraction is withdrawn from stabilizer 23 and passed to the usual fractionation system for segregation of aromatic products or high octane gasoline. Gas separated in stabilizer 23 is passed to fractionator 24 where the $C_3$ and lighter and $C_4$ and heavier fractions are separated. Gas separated in separator 20 and fractionator 24 is removed respectively through lines 25 and 26 which may be connected by valved line 27. Hydrogen rich tail gas for recycle is returned to the process by line 28, compressor 29 and line 17. The $C_4$ and heavier fraction is withdrawn from fractionator 24 through line 30 and passed to separator 31 where the iso-butane is separated from the n-butane. Iso-butane is withdrawn through line 32. N-butane is withdrawn through line 33 and passed to heater 34.

The heated n-butane is then passed to the onstream reactor of the pair of adiabatic fixed bed type reactors 35 and 36 by means of connection 37, selection valve system 38 and one of connections 39 or 40. The effluent from the onstream reactor is withdrawn by one of the connections 41 or 42 and selection valve system 43 to line 44 and cooler 45. The cooled stream is then passed serially through a system of gas-liquid separators and compressors comprising flash drum 46, compressor 47, flash drum 48, compressor 49 and flash drum 50. The flashed gas may be passed through absorber 51 from which non-condensible gas is removed by line 52 and from which condensed or absorbed liquid components are removed by line 53. The liquid product in line 53 is combined with the liquid fractions recovered in the separation and compressor stages and collected in line 54 and the combined liquid product stream is passed to the usual fractionation system for segregation of n-butylene.

Reactors 35 and 36 are provided with pelleted chromium oxide-alumina catalyst in bed form. The catalyst is cyclically regenerated by switching the flow after a period of hydrocarbon processing to a flow of a regeneration gas containing air and flue gas. The air stream is advantageously diluted with flue gas to prevent excessively high temperatures during regeneration. Advantageously, each cycle is preceded by evacuation and then a short purge period during which flue gas is passed through the catalyst bed. As shown in the drawing, air may be supplied by blower 55 and lines 56 and 57 through heat exchanger 58 and line 59 to selection valve system 38 from where it is directed to the appropriate reactor 35 or 36 which is undergoing regeneration. Flue gas is withdrawn by line 41 or 42 to selection valve system 43 and is passed by means of line 60 through heat exchanger 68. Flue gas for purge and regeneration may be supplied by blower 61, line 62 and thence through the regeneration air system.

By way of illustration of the operation of Figure 1, a 200° to 375° F. naphtha and n-butane may be charged to the first stage. The first stage conditions advantageously approximate 500 p. s. i. g. total pressure, 10/1 gas recycle mole ratio, 900° F., 4 LHSV naphtha and 2 LHSV n-butane. Instead of n-butane, n-pentane or mixtures of the two may be employed. A typical reformate and isobutane representing about a 25 percent conversion of n-butane are produced in the first stage and separated from its effluent. In the second stage the unconverted butane is converted to n-butylene. In this second stage, the conditions may be as high as one atmosphere total pressure, 1000 gas hourly space velocity for the n-butane feed and 1050° F. for 10 minute hydrocarbon process period.

I claim:

1. A two-stage process for the catalytic conversion of hydrocarbon feed stocks boiling within the gasoline range which comprises contacting a mixture of such a stock and a material consisting essentially of a light normally gaseous normal $C_4$ to $C_5$ paraffin fraction in a first reaction stage with a reforming catalyst in the presence of hydrogen under reforming conditions of temperature, pressure and space velocity, separating gas and liquid fractions from the reaction effluent, withdrawing the liquid fraction, separating isoparaffin from the unconverted normal paraffin in the gas fraction, withdrawing the isoparaffin fraction, contacting the unconverted normal paraffin fraction with a chromium oxide-alumina catalyst under dehydrogenation conditions of space velocity and elevated temperature including sub-atmospheric to approximately atmospheric pressure, and separating a normal olefin fraction from the second stage reaction effluent.

2. The process of claim 1 in which hydrogen rich gas separated in the course of the process provides by recycle the hydrogen for the first stage reaction.

3. The process of claim 1 in which the first stage reaction is conducted in the presence of a platinum-type reforming catalyst.

4. The process of claim 1 in which the first stage reaction is conducted in the presence of a molybdenum oxide-alumina type reforming catalyst.

5. The process of claim 1 in which the feed stock comprises a mixture of a 200° to 375° F. straight run naphtha and n-butane, and from which an aromatic rich liquid fraction is ultimately recovered from the first stage reaction effluent and n-butylene is ultimately recovered from the second stage reaction effluent.

References Cited in the file of this patent
UNITED STATES PATENTS

| | | |
|---|---|---|
| 2,353,490 | Noorduyn | July 11, 1944 |
| 2,367,621 | Schulze et al. | Jan. 16, 1945 |
| 2,409,695 | Laughlin | Oct. 22, 1946 |
| 2,479,109 | Haensel | Aug. 16, 1949 |
| 2,484,381 | Johnson et al. | Oct. 11, 1949 |
| 2,500,920 | Dague et al. | Mar. 21, 1950 |
| 2,626,893 | Morrow | Jan. 27, 1953 |
| 2,718,535 | McKinley et al. | Sept. 20, 1955 |
| 2,740,751 | Haensel et al. | Apr. 3, 1956 |